US012196402B1

(12) United States Patent
Xu et al.

(10) Patent No.: US 12,196,402 B1
(45) Date of Patent: Jan. 14, 2025

(54) LAMP BODY, TABLE LAMP, AND STAKE LAMP

(71) Applicant: JIANGMEN CITY SHENGDA LIGHTING CO., LTD., Jiangmen (CN)

(72) Inventors: Xiaojun Xu, Jiangmen (CN); Haiyan Xu, Jiangmen (CN); Caiju Sun, Jiangmen (CN)

(73) Assignee: JIANGMEN CITY SHENGDA LIGHTING CO., LTD., Jiangmen (CN)

( * ) Notice: Subject to any disclaimer, the term of this patent is extended or adjusted under 35 U.S.C. 154(b) by 0 days.

(21) Appl. No.: 18/736,537

(22) Filed: Jun. 7, 2024

(30) Foreign Application Priority Data

Jan. 12, 2024 (CN) ......................... 202420090046.6

(51) Int. Cl.
*F21V 23/06* (2006.01)
*F21K 9/23* (2016.01)
*F21K 9/27* (2016.01)
*F21S 6/00* (2006.01)
*F21V 17/12* (2006.01)
(Continued)

(52) U.S. Cl.
CPC ................ *F21V 23/06* (2013.01); *F21K 9/23* (2016.08); *F21K 9/27* (2016.08); *F21S 6/002* (2013.01); *F21V 17/12* (2013.01); *F21V 21/0824* (2013.01); *F21Y 2107/30* (2016.08); *F21Y 2113/00* (2013.01); *F21Y 2115/10* (2016.08)

(58) Field of Classification Search
CPC ...... F21V 23/06; F21V 17/12; F21V 21/0824; F21K 9/23; F21K 9/27; F21S 6/002
See application file for complete search history.

(56) References Cited

U.S. PATENT DOCUMENTS 6,343,870 B1 * 2/2002 Chang ....................... F21S 4/10 439/619
2009/0046461 A1 * 2/2009 Fan ........................... F21V 3/02 362/242

(Continued)

FOREIGN PATENT DOCUMENTS

CN 216448032 U * 5/2022
CN 115355459 A * 11/2022 ................ F21S 4/10

OTHER PUBLICATIONS

English translation of Huang CN-216448032-U (Year: 2022).*
English translation of Xu CN-115355459-A (Year: 2022).*

*Primary Examiner* — Evan P Dzierzynski

(57) ABSTRACT

A lamp body, a table lamp, and a stake lamp are provided. The lamp body includes a lampshade, a light-emitting body, a terminal connecting base, a terminal connector, and a wire. The lampshade defines an opening. The light-emitting body is placed in the lampshade through the opening. A plug is disposed on one end of the light-emitting body. The terminal connecting base is detachably connected to the opening. The terminal connector is matched with the plug. One end of the terminal connector is screwed with a first end of the terminal connecting base. The wire passes through a second end of the terminal connecting base and is electrically connected to the terminal connector, the plug is plugged into the terminal connector. Not only a height of the light-emitting body after plugging is adjusted by rotating the terminal connector, but also rigid support of the light-emitting body is realized.

10 Claims, 10 Drawing Sheets

(51) Int. Cl.

| | |
|---|---|
| ***F21V 21/08*** | (2006.01) |
| *F21Y 107/30* | (2016.01) |
| *F21Y 113/00* | (2016.01) |
| *F21Y 115/10* | (2016.01) |

(56) References Cited

U.S. PATENT DOCUMENTS

2023/0047982 A1* 2/2023 Wu ........................... F21S 4/10
2023/0408050 A1* 12/2023 Chen ....................... F21S 6/004

* cited by examiner

LAMP BODY, TABLE LAMP, AND STAKE LAMP

TECHNICAL FIELD

The present disclosure relates to a field of lamp bodies, and in particular to a lamp body, a table lamp, and a stake lamp.

BACKGROUND

Stake lamps are lighting fixtures mounted on the ground and are commonly used in outdoor environments. The stake lamps are connected to a power source through a ground outlet or a plug to provide lighting, and the stake lamps has many different designs and uses, such as decorative stake lamps and functional stake lamps. The decorative stake lamps are generally used to decorate a space and provide a romantic ambience, which have various designs and stylish appearance and can be matched with different decoration styles. The functional stake lamps are generally used to provide lighting and have a high lighting intensity and a large lighting range.

The CN patent application No. CN216619516U discloses a detachable stake lamp. A stake thereof is connected to a lower end of a lamp post, and a base thereof is connected to an upper end of the lamp post. A light source thereof is disposed on the base and the light source is connected to a power cord. The stake is tapered, and the stake defines a plugging hole therein. The lamp post is plugged into the plugging hole. A wiring groove of the stake is defined opposite to the plugging hole. The lamp post is a split plug-in structure or a snap-on structure. The light source is disposed on the base and the light source is connected to the power cord. After a lampshade thereof is mounted, light emitted by the light source is concentrated at an opening of the lampshade, so that light emits out from the lampshade is uneven.

SUMMARY

In view of the above-mentioned defects in the prior art, a purpose of the present disclosure is to provide a lamp body, a terminal connector thereof is plugged in a light-emitting body, and the terminal connector is screwed with the terminal connecting base. Not only a height of the light-emitting body after plugging is adjusted by rotating the terminal connector, but also rigid support of the light-emitting body is realized, so that the light-emitting body is adjusted to be disposed in a center position of a lampshade thereof to enable light emitted from the lampshade uniform.

To achieve the above object, the present disclosure provides a lamp body. The lamp body comprises a lampshade, a light-emitting body, a terminal connecting base, a terminal connector, and a wire.

The lampshade defines an opening. The light-emitting body is capable of being placed into the lampshade through the opening. A plug is disposed on one end of the light-emitting body. The terminal connecting base is detachably connected to the opening. The terminal connector is matched with the plug. One end of the terminal connector is screwed with a first end of the terminal connecting base. The wire passes through a second end of the terminal connecting base and is electrically connected to the terminal connector. The plug is plugged into the terminal connector.

Furthermore, in one optional embodiment, first outer threads are disposed on an outer surface of the terminal connecting base. First inner threads matched with the first outer threads are disposed on the opening. The terminal connecting base is screwed with the opening by screwing the first outer threads with the first inner threads.

Furthermore, in one optional embodiment, a through hole is defined on a middle portion of the terminal connecting base. Second inner threads are disposed on one end of the through hole. Second outer threads matched with the second inner threads of the through hole are disposed on an outer surface of the one end of the terminal connector. The terminal connector is screwed with the through hole by screwing the second outer threads with the first inner threads.

Furthermore, in one optional embodiment, the light-emitting body comprises a circuit board, a light strip, and a support. The support is cylindrical. The light strip is wrapped around an outer side of the support. The circuit board is disposed in the support. The plug is disposed on one end of the circuit board. The circuit board is electrically connected to the light strip and the plug.

Furthermore, in one optional embodiment, one end of the support is closed. Lamp beads are uniformly disposed on a surface of the one end of the support. The lamp beads are electrically connected to the circuit board.

Furthermore, in one optional embodiment, the terminal connector and the wire are integrally formed.

Based on same inventive concept, the present disclosure further provides a table lamp. The table lamp comprises the lamp body mentioned above, a table lamp post, and a base. A first end of the table lamp post is detachably connected to the base. A second end of the table lamp post is detachably connected to the terminal connecting base. The wire passes through the terminal connecting base and the table lamp post and inserts into the base.

Furthermore, in one optional embodiment, the first end of the table lamp post is screwed with the base. The second end of the table lamp post is screwed with the terminal connecting base.

Based on same inventive concept, the present disclosure further provides a stake lamp. The stake lamp comprises the lamp body mentioned above, a stake connecting post, and a stake. A first end of the stake connecting post is detachably connected to the second end of the terminal connecting base. The wire passes through the terminal connecting base and passes out of the stake connecting post from a second end of the stake connecting post.

Furthermore, in one optional embodiment, a first end of the stake is sharp, a second end of the stake is inserted into a hole on the second end of the stake connecting post, and a cross section of an insertion portion of the stake is cross-shaped.

Furthermore, in one optional embodiment, the stake connecting post comprises sub-posts. Each two adjacent sub-posts are screwed with each other.

Compared with the prior art, in the present disclosure, the terminal connector is plugged into the light-emitting body, and the terminal connector is screwed with the terminal connecting base. Not only the height of the light-emitting body after plugging is adjusted by rotating the terminal connector, but also rigid support of the light-emitting body is realized, so that the light-emitting body is adjusted to be disposed in the center position of the lampshade thereof to enable the light emitted from the lampshade uniform.

In particular, the terminal connector of the present disclosure is connected to the light-emitting body in a pluggable manner, and the terminal connecting base is detachably connected to the opening of the lampshade, so that the light-emitting body is easily replaced after the light-emitting body is damaged or reaches an end of service life. A structural connection of the lamp body is simple and an assembly thereof is convenient.

In the light-emitting body of the present disclosure, the lamp strip wraps the support to form an annular light-emitting body, making the light transmitted from the lampshade uniform. In particular, the one end of the support is closed, and the lamp beads are evenly disposed on the surface of the one end of the support, so that the one end of the support is further utilized and an light-emitting angle of the light-emitting body is improved.

The terminal connector and the wire of the present disclosure are integrally injection molded, and the second outer threads of the terminal connector are also integrally molded. When in use, the wire firstly passes through the through hole of the terminal connecting base, and then the second outer threads of the terminal connector are screwed with the second inner threads of the through hole. Then, the terminal connector is plugged into the light-emitting body, and the lampshade is attached to the light-emitting body through the opening of the lampshade. Finally, the first inner threads of the opening is screwed with the first outer threads of the terminal connecting base. In summary, an assembly method thereof is simple, and each single piece thereof is easily replaced when it is damaged.

Figure 1:
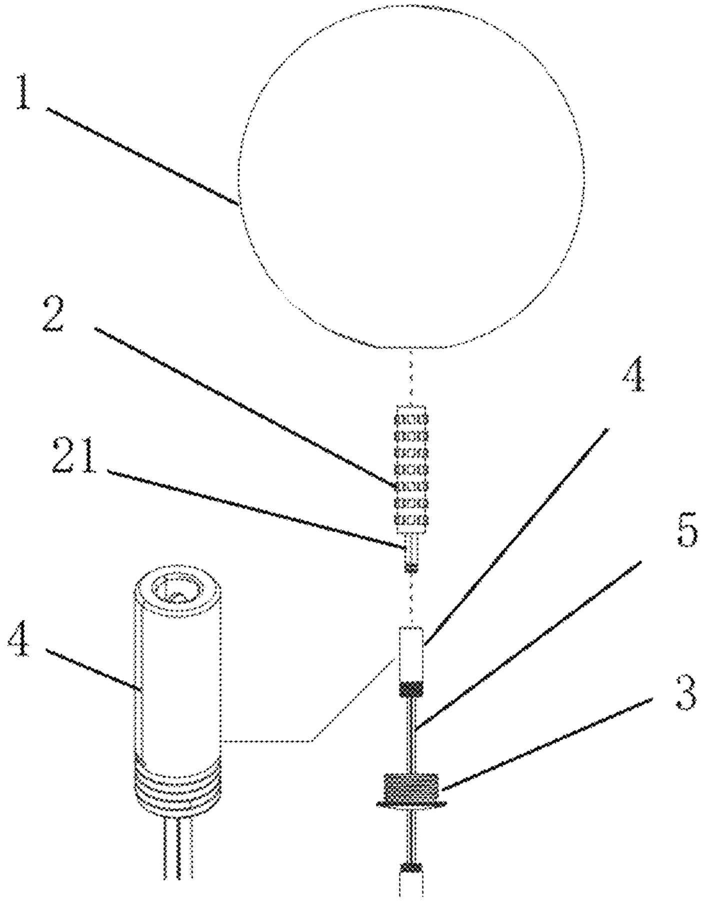
FIG. 1 is an exploded schematic diagram of a lamp body according to one embodiment of the present disclosure.

1—lampshade, 11—opening, 2—light-emitting body 21—plug, 22—circuit board, 23—light strip, 24—support, 25—lamp bead, 3—terminal connecting base, 31—through hole, 4—terminal connector, 5—wire, 6—table lamp post, 7—base, 8—stake connecting post, 9—stake.

DETAILED DESCRIPTION

In order to enable those skilled in the art to better understand the technical solutions in the present disclosure, technical solutions in the embodiments of the present disclosure will be clearly and completely described below in conjunction with the accompanying drawings in the embodiments of the present disclosure. Obviously, the described embodiments are only a part of the embodiments of the present disclosure, rather than all of the embodiments. Based on the embodiments of the present disclosure, all other embodiments obtained by those of ordinary skill in the art without creative work shall fall within the protection scope of the present disclosure.

It should be noted that when one component is referred to as being "fixed on" or "disposed on" another component, it can be directly disposed on the other component or it may be indirectly fixed or disposed on the other component through a third component. When one component is said to be "connected to" another component, it may be directly connected to the other component or it may be indirectly connected to the other component through a third component.

It should be understood that in the description of the present disclosure terms such as "length", "width", "upper", "lower", "left", "right", "vertical", "horizontal", "top", "bottom", "inner", "outer", "inner", etc. indicate direction or position relationships shown based on the drawings, and are only intended to facilitate the description of the present disclosure and the simplification of the description rather than to indicate or imply that the indicated device or element must have a specific direction or constructed and operated in a specific direction, and therefore, shall not be understood as a limitation to the present disclosure.

In addition, terms such as "first" and "second" are only used for the purpose of description, rather than being understood to indicate or imply relative importance or hint the number of indicated technical features. Thus, the feature limited by "first" and "second" can explicitly or impliedly comprise one or more features. In the description of the present disclosure, the meaning of "a plurality of" is two or more unless otherwise specified.

It is noted that structures, proportions, sizes, and the like shown in the drawings of the present specification are only used to cooperate with the contents disclosed in the description, so as to be understood and read by those skilled in the art, and are not intended to limit the limiting conditions that can be implemented by the present disclosure, so that the technical content disclosed in the present disclosure should still fall within the scope covered by the technical content disclosed in the present disclosure without affecting the effect and the purpose that can be achieved in the present disclosure.

Embodiments

This embodiment is intended to solve a problem that a light-emitting body of a conventional stake lamp is fixedly disposed at an opening of a lampshade thereof, and light emitted is mainly concentrated in the opening of the lampshade, resulting in uneven light transmitted from the lampshade, especially a long lampshade.

Therefore, the present disclosure is to provide a lamp body, a terminal connector 4 thereof is plugged in a light-emitting body 2, and the terminal connector 4 is screwed with the terminal connecting base 3. Not only a height of the light-emitting body 2 after plugging is adjusted by rotating the terminal connector 4, but also rigid support of the light-emitting body 2 is realized, so that the light-emitting body 2 is adjusted to be disposed in a center position of a lampshade 1 thereof to enable light emitted from the lampshade 1 uniform.

As shown in FIG. 1, the lamp body comprises a lampshade 1, a light-emitting body 2, a terminal connecting base 3, a terminal connector 4, and a wire 5.

The lampshade 1 defines an opening 11. The light-emitting body 2 is capable of being placed into the lampshade 1 through the opening 11. A plug 21 is disposed on one end of the light-emitting body 2. The terminal connecting base 3 is detachably connected to the opening 11. The terminal connector 4 is matched with the plug 21. One end of the terminal connector 4 is screwed with a first end of the terminal connecting base 3. The wire 5 passes through a second end of the terminal connecting base 3 and is electrically connected to the terminal connector 4. The plug 21 is plugged into the terminal connector 4.

Figure 2:
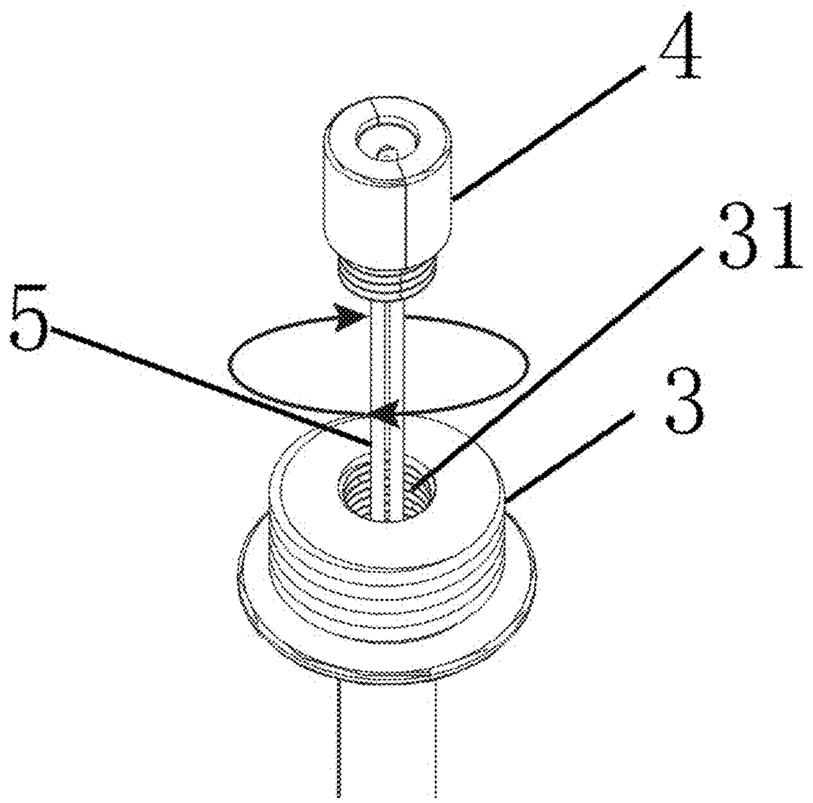
FIG. 2 is an exploded schematic diagram of a terminal connecting base and a terminal connector according to one embodiment of the present disclosure.

Specifically, as shown in FIG. 2, first outer threads are disposed on an outer surface of the terminal connecting base 3. First inner threads matched with the first outer threads are disposed on the opening 11. The terminal connecting base 3 is screwed with the opening 11 by screwing the first outer threads with the first inner threads.

Specifically, as shown in FIG. 2, a through hole 31 is defined on a middle portion of the terminal connecting base 3. Second inner threads are disposed on one end of the through hole 31. Second outer threads matched with the second inner threads of the through hole 31 are disposed on an outer surface of the one end of the terminal connector 4. The terminal connector 4 is screwed with the through hole 31 by screwing the second outer threads with the first inner threads.

Figure 3:
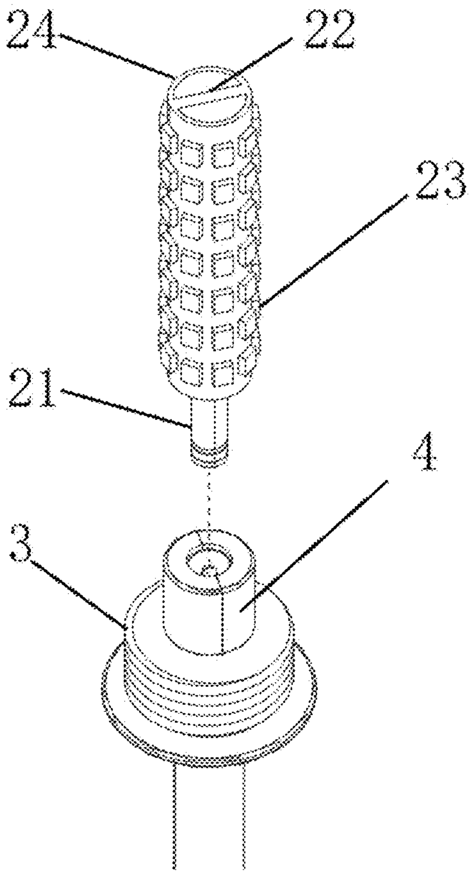
FIG. 3 is an exploded schematic diagram of a first embodiment of a light-emitting body and the terminal connector according to one embodiment of the present disclosure.
Figure 4:
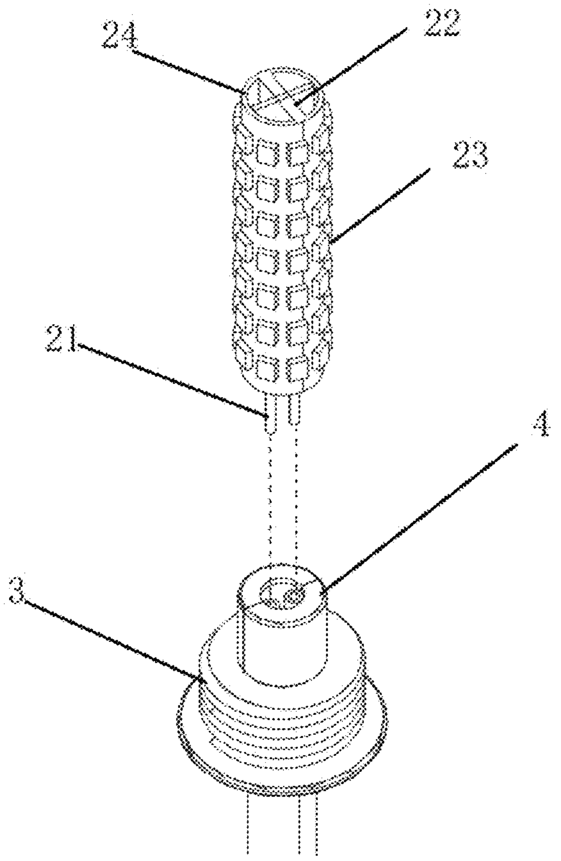
FIG. 4 is an exploded schematic diagram of a second embodiment of the light-emitting body and the terminal connector according to one embodiment of the present disclosure.

Specifically, as shown in FIGS. 3 and 4, the light-emitting body 2 comprises a circuit board 22, a light strip 23, and a support 24. The support 24 is cylindrical. The light strip 23 is wrapped around an outer side of the support 24. The circuit board 22 is disposed in the support 24. The plug 21 is disposed on one end of the circuit board 22. The circuit board 22 is electrically connected to the light strip and the plug 21.

FIG. 3 shows that the plug 21 is a rotatable plug 21, which is used for low-voltage power connection. The plug 21 is a male plug socket, and the terminal connector is a plug female socket connected to the plug 21. The plug 21 may be a headphone plug, a direct-current (DC) plug, an audio plug, or other cylindrical plug to support, fix, and electrically connect the light-emitting body 2. During a plugging process, the plug 21 or the terminal connector is rotated arbitrarily, and an electrical connection thereof maintains. FIG. 4 shows that the plug 21 is a double-pin plug with separated positive and negative poles, which is used for high-voltage power connection.

Figure 5:
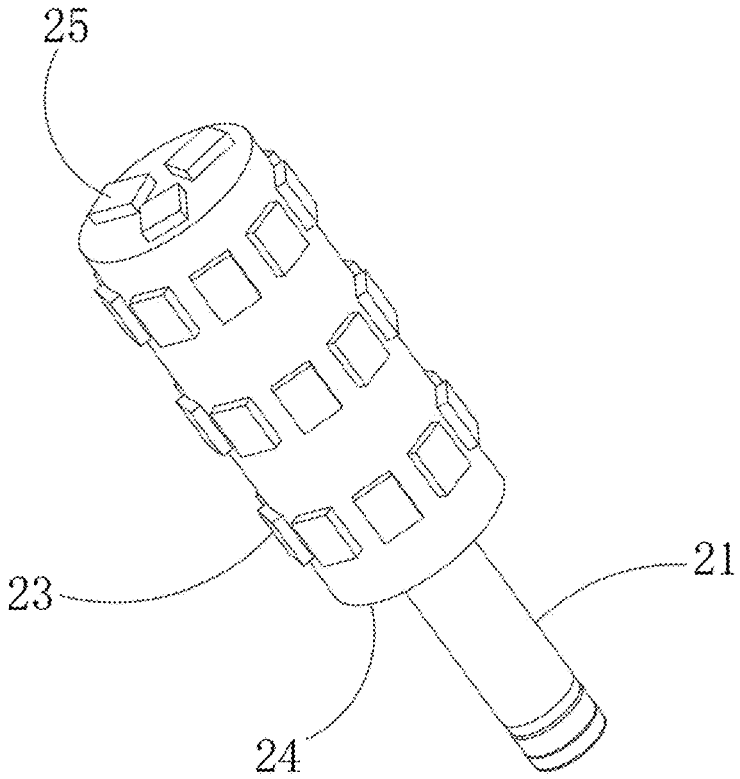
FIG. 5 is a schematic diagram of the first embodiment of the light-emitting body according to one embodiment of the present disclosure.
Figure 6:
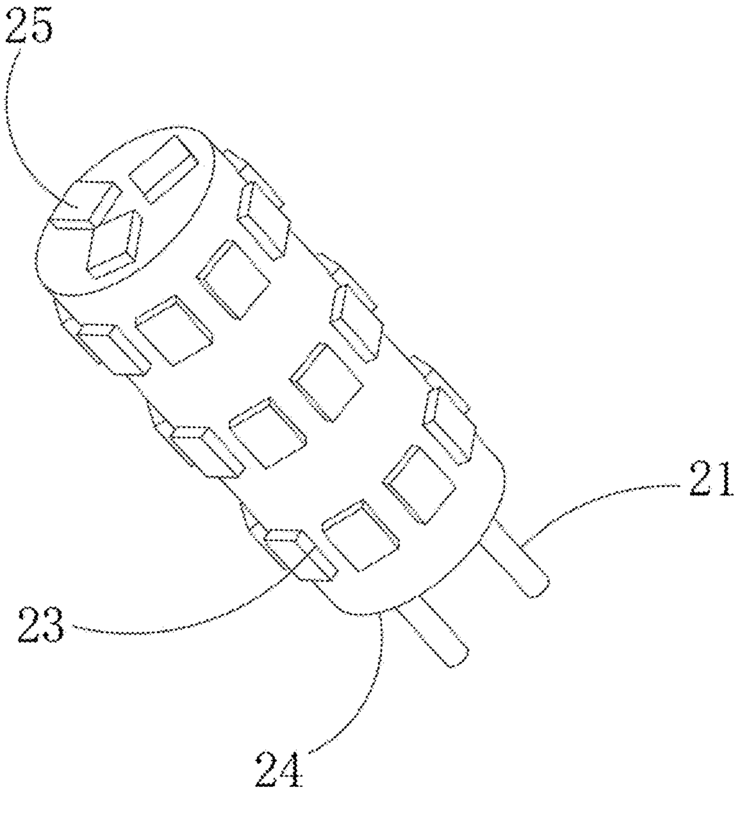
FIG. 6 is a schematic diagram of the second embodiment of the light-emitting body according to one embodiment of the present disclosure.

As shown in FIGS. 5 and 6, specifically, one end of the support 24 is closed. Lamp beads 25 are uniformly disposed on a surface of the one end of the support 24. The lamp beads 25 are electrically connected to the circuit board 22.

Specifically, the terminal connector 4 and the wire 5 are integrally formed.

Figure 7:
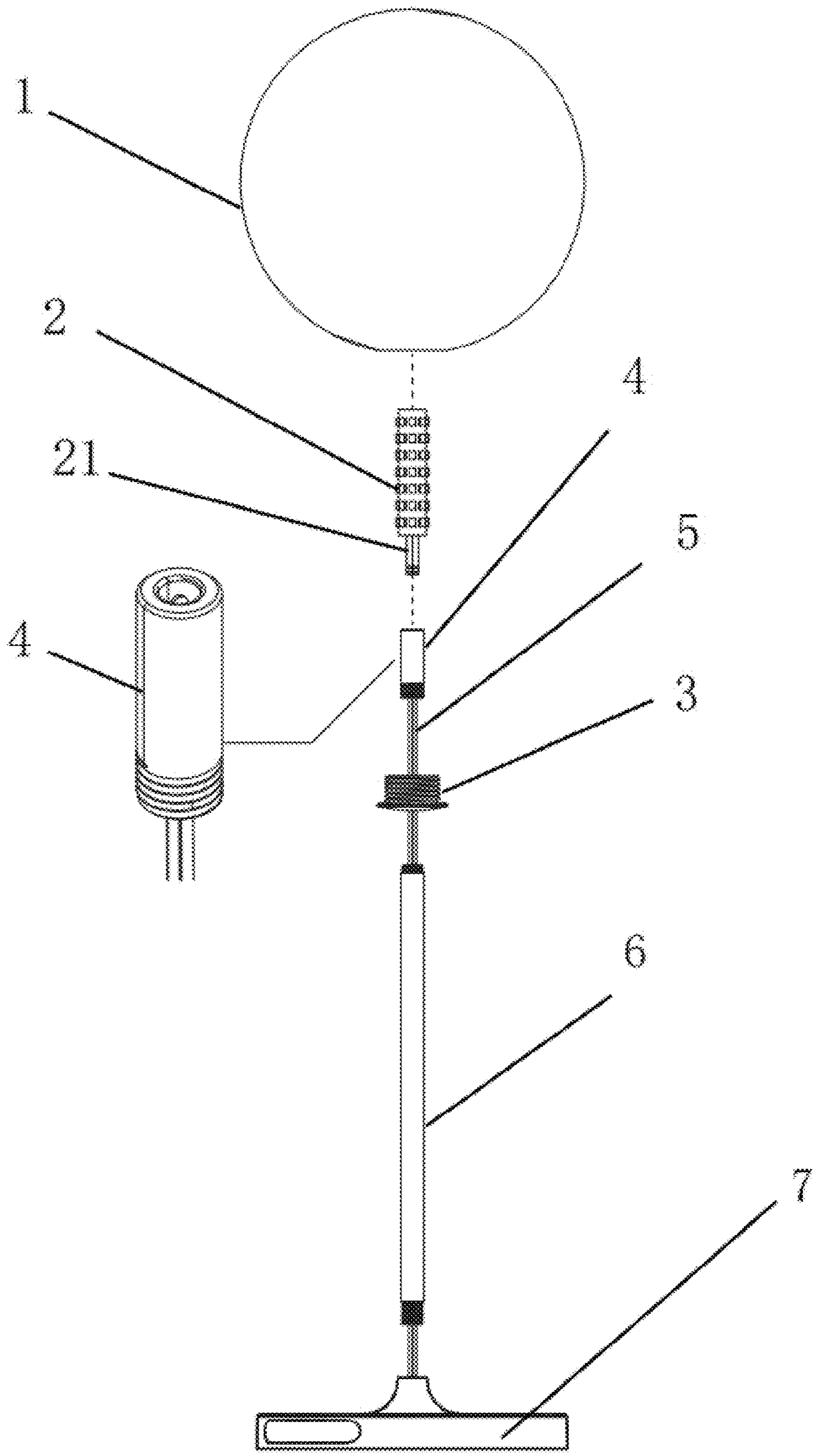
FIG. 7 is an exploded schematic diagram of a table lamp according to one embodiment of the present disclosure.
Figure 8:
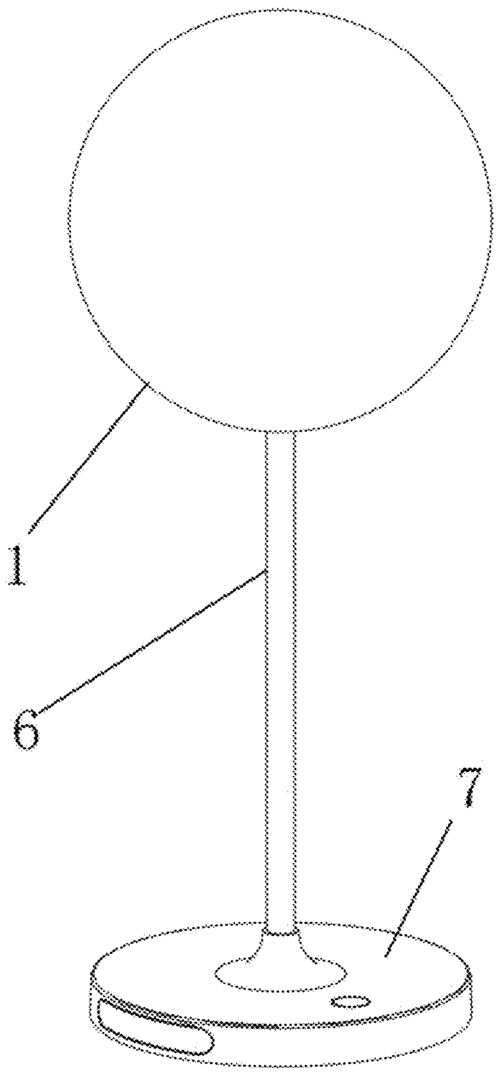
FIG. 8 is a schematic diagram of the table lamp with a spherical lampshade according to one embodiment of the present disclosure.
Figure 9:
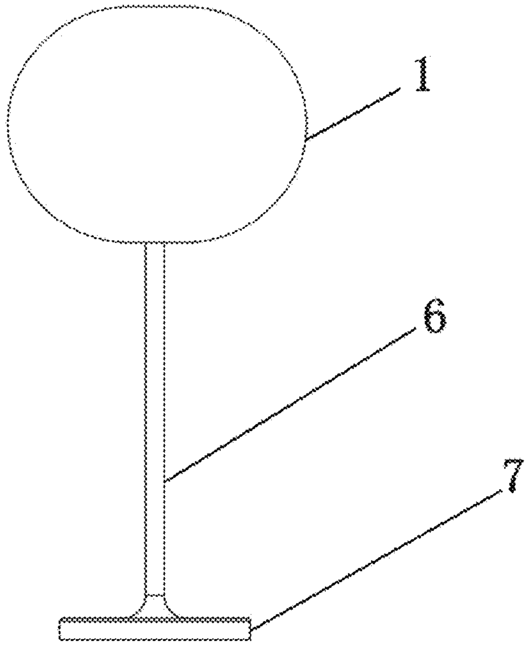
FIG. 9 is a schematic diagram of the table lamp with an ellipsoidal lampshade according to one embodiment of the present disclosure.

As shown in FIGS. 7-9, based on same inventive concept, the present disclosure further provides a table lamp. The table lamp comprises the lamp body mentioned above, a table lamp post 6, and a base 7. A first end of the table lamp post 6 is detachably connected to the base 7. A second end of the table lamp post 6 is detachably connected to the terminal connecting base 3. The wire 5 passes through the terminal connecting base 3 and the table lamp post 6 and inserts into the base 7.

Specifically, the first end of the table lamp post 6 is screwed with the base 7. The second end of the table lamp post 6 is screwed with the terminal connecting base 3. It should be noted that the second inner threads are disposed in the through hole 31 of the terminal connecting base 3. The second inner threads disposed on a first end of the through hole are screwed with the terminal connector 4, and the second inner threads disposed on the second end of the through hole are screwed with the table lamp post 6.

Figure 10:
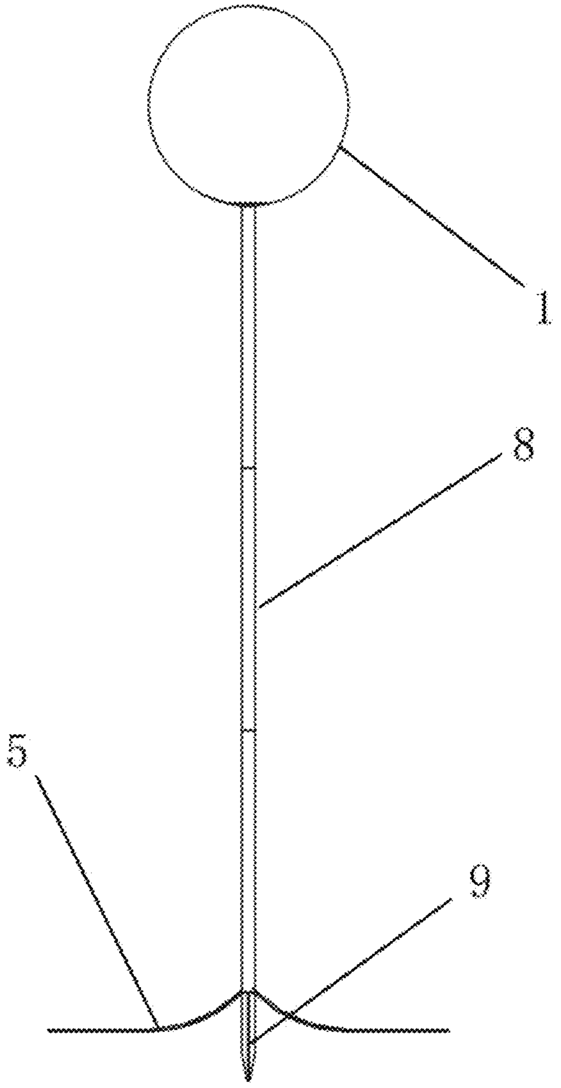
FIG. 10 is a schematic diagram of a stake lamp according to one embodiment of the present disclosure.
Figure 11:
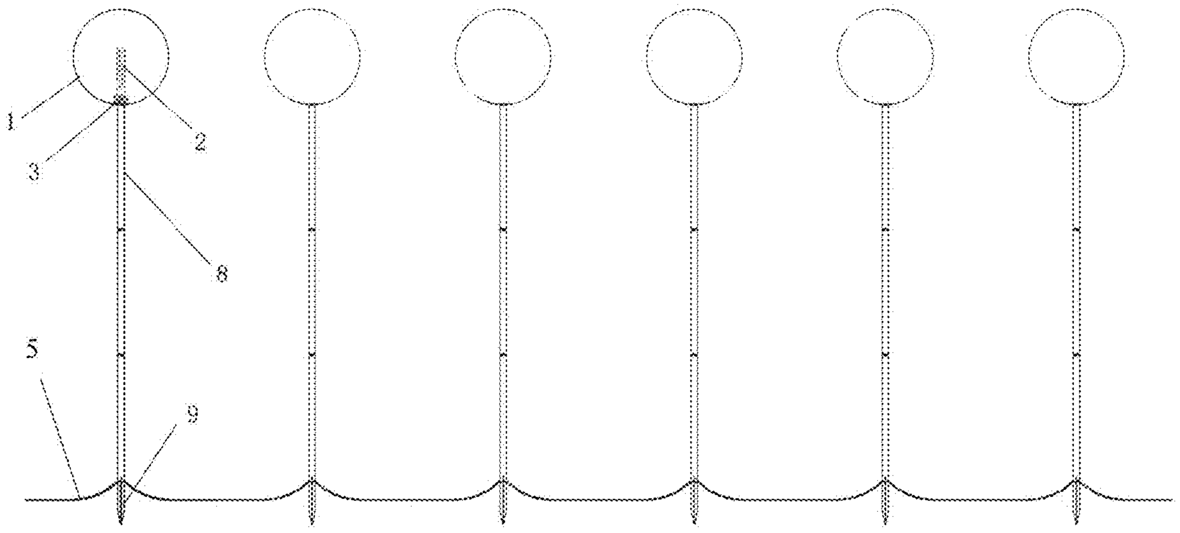
FIG. 11 is a schematic diagram of stake lamps connected in series according to one embodiment of the present disclosure.

As shown in FIGS. 10 and 11, based on same inventive concept, the present disclosure further provides a stake lamp. The stake lamp comprises the lamp body mentioned above, a stake connecting post 8, and a stake 9. A first end of the stake connecting post 8 is detachably connected to the second end of the terminal connecting base 3. The wire 5 passes through the terminal connecting base 3 and passes out of the stake connecting post 8 from a second end of the stake connecting post 8. It should be noted that the second inner threads are disposed in the through hole 31 of the terminal connecting base 3. The second inner threads disposed on the first end of the through hole are screwed with the terminal connector 4, and the second inner threads disposed on the second end of the through hole are screwed with the stake connecting post 8.

Specifically, a first end of the stake 9 is sharp, a second end of the stake 9 is inserted into a hole on the second end of the stake connecting post 8, and a cross section of an insertion portion of the stake 9 is cross-shaped.

The stake connecting post 8 comprises sub-posts. Each two adjacent sub-posts are screwed with each other. Third inner threads are disposed on a first end of each of the sub-posts, and third outer threads are disposed on a second end of each of the sub-posts, so each two adjacent sub-posts are screwed with each other.

Furthermore, as shown in FIG. 11, a plurality of stake lamps are connected in series through wires 5.

The above description of the disclosed embodiments enables those skilled in the art to implement or use the present disclosure. A variety of modifications to these embodiments are apparent to those skilled in the art, and general principles defined in the specification can be implemented in other embodiments without departing from the spirit or scope of the present disclosure. Thus, the present disclosure should not be limited to the embodiments disclosed herein, and should be subject to the widest scope consistent with the principles and novel features disclosed herein.

What is claimed is:

1. A lamp body, comprising:

a lampshade, a light-emitting body, a terminal connecting base, a terminal connector, and a wire;

wherein the lampshade defines an opening; the light-emitting body is capable of being placed into the lampshade through the opening; a plug is disposed on one end of the light-emitting body; the terminal connecting base is detachably connected to the opening; the terminal connector is matched with the plug; one end of the terminal connector is screwed with a first end of the terminal connecting base; the wire passes through a second end of the terminal connecting base and is electrically connected to the terminal connector; the plug is plugged into the terminal connector.

2. The lamp body according to claim 1, wherein first outer threads are disposed on an outer surface of the terminal connecting base; first inner threads matched with the first outer threads are disposed on the opening; the terminal connecting base is screwed with the opening by screwing the first outer threads with the first inner threads.

3. The lamp body according to claim 1, wherein a through hole is defined on a middle portion of the terminal connecting base; second inner threads are disposed on one end of the through hole; second outer threads matched with the second inner threads of the through hole are disposed on an outer surface of the one end of the terminal connector; the terminal connector is screwed with the through hole by screwing the second outer threads with the first inner threads.

4. The lamp body according to claim 3, wherein the terminal connector and the wire are integrally formed.

5. The lamp body according to claim 1, wherein the light-emitting body comprises a circuit board, a light strip, and a support; the support is cylindrical; the light strip is wrapped around an outer side of the support; the circuit board is disposed in the support, the plug is disposed on one end of the circuit board; the circuit board is electrically connected to the light strip and the plug.

6. The lamp body according to claim 5, wherein one end of the support is closed; lamp beads are uniformly disposed on a surface of the one end of the support; the lamp beads are electrically connected to the circuit board.

7. A table lamp, comprising:

the lamp body according to claim 1, a table lamp post, and a base;

wherein a first end of the table lamp post is detachably connected to the base; a second end of the table lamp post is detachably connected to the terminal connecting base;

the wire passes through the terminal connecting base and the table lamp post and inserts into the base.

8. The table lamp according to claim 7, wherein the first end of the table lamp post is screwed with the base; the second end of the table lamp post is screwed with the terminal connecting base.

9. A stake lamp, comprising:

the lamp body according to claim 1, a stake connecting post, and a stake;

wherein a first end of the stake connecting post is detachably connected to the second end of the terminal connecting base; the wire passes through the terminal connecting base and passes out of the stake connecting post from a second end of the stake connecting post.

10. The stake lamp according to claim 9, wherein the stake connecting post comprises sub-posts; each two adjacent sub-posts are screwed with each other.

* * * * *